US009211031B1

(12) United States Patent
Paredez

(10) Patent No.: US 9,211,031 B1
(45) Date of Patent: Dec. 15, 2015

(54) EGG COOKING SYSTEM

(71) Applicant: Rose Mary A. Paredez, San Antonio, TX (US)

(72) Inventor: Rose Mary A. Paredez, San Antonio, TX (US)

( * ) Notice: Subject to any disclaimer, the term of this patent is extended or adjusted under 35 U.S.C. 154(b) by 380 days.

(21) Appl. No.: 13/938,769

(22) Filed: Jul. 10, 2013

(51) Int. Cl.
*A23B 5/00* (2006.01)
*A23J 1/09* (2006.01)
*A47J 43/14* (2006.01)
*A47J 37/08* (2006.01)
*A47J 29/04* (2006.01)

(52) U.S. Cl.
CPC *A47J 29/04* (2013.01); *A47J 43/14* (2013.01); *A47J 37/0821* (2013.01)

(58) Field of Classification Search
CPC ............ A47J 37/0821; A47J 37/0611; A47J 37/0694; A47J 37/0704; A47J 29/06; A47J 29/04; A47J 43/14; A47J 43/145; A47J 36/027; A47J 36/02; A47J 36/06; A47J 27/10; A21B 5/08; A21B 5/026; A21B 3/13; H05B 6/6411; H05B 6/6408; B65D 81/3453; B65D 25/04; B65D 21/0233
USPC ........... 99/335, 336, 354, 381–384, 419, 426, 99/439–442, 447, 497, 500; 219/726, 729, 219/731–735; 220/573.1, 573.4, 573.5, 220/912, 507; 206/514
See application file for complete search history.

(56) References Cited

U.S. PATENT DOCUMENTS

| | | | | | |
|---|---|---|---|---|---|
| 3,791,285 | A | * | 2/1974 | Mack | A23L 1/322 99/419 |
| 3,857,327 | A | * | 12/1974 | Popeil | A47J 43/14 220/23.8 |
| D255,756 | S | * | 7/1980 | Dybala | D7/360 |
| 4,413,167 | A | * | 11/1983 | Martel | A23B 5/01 219/729 |
| 5,054,384 | A | * | 10/1991 | Smith, Jr. | A47J 43/145 99/335 |
| 6,095,038 | A | * | 8/2000 | Cerro | A23J 1/09 99/497 |
| 6,303,915 | B1 | * | 10/2001 | Young | A23J 1/09 219/733 |
| 6,329,004 | B1 | * | 12/2001 | Fernandez | A23L 1/0128 219/726 |
| 2007/0101871 | A1 | * | 5/2007 | Patterson | A47J 43/14 99/495 |
| 2013/0319260 | A1 | * | 12/2013 | Nasrallah | A47J 43/14 99/497 |

* cited by examiner

*Primary Examiner* — Dana Ross
*Assistant Examiner* — Hemant Mathew

(57) ABSTRACT

An egg cooking system features a rectangular reservoir pan and an egg white pan with a cover. The egg white pan features one doubly pivoting handle located on an egg white pan first side top edge. The egg white pan nests in the reservoir pan and has a gap located between an exterior surface of the egg white pan and an interior surface of the reservoir pan. The system features a rectangular planar egg dicer having a plurality of dicer blades located on a perpendicular grid pattern. The system features a yolk cooker having a plurality of first hemispherical yolk holders located on a yolk cooker first side and a plurality of second hemispherical yolk holders are located on a yolk cooker second side. The yolk cooker first side is pivotally located on the yolk cooker second side.

3 Claims, 5 Drawing Sheets

EGG COOKING SYSTEM

FIELD OF THE INVENTION

The present invention relates to cooking containers, or more specifically cooking containers used in egg preparation.

BACKGROUND OF THE INVENTION

Hard boiled eggs have been a popular food for many years. There are a number of ways to cook the eggs, although most of them involve peeling of the shell once the egg is cooked. This process is time consuming and messy. The present invention features an egg cooking system that is less time consuming and less messy than current methods.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features an egg cooking system with a rectangular reservoir pan. In some embodiments, a pan first side and a pan second side each comprise a pivoting handle located thereon. In some embodiments, the system comprises an egg white pan with a cover located on an egg white pan top. In some embodiments, the egg white pan comprises a plurality of elevated feet. In some embodiments, the egg white pan comprises one doubly pivoting handle located on an egg white pan first side top edge thereon. In some embodiments, the egg white pan nests in the reservoir pan. In some embodiments, a gap is located between an exterior surface of the egg white pan and an interior surface of the reservoir pan.

In some embodiments, the system comprises a rectangular planar egg dicer having a plurality of dicer blades located on a perpendicular grid pattern. In some embodiments, a dicer handle is located on an egg dicer top surface thereon. In some embodiments, the egg dicer nests in the egg white pan. In some embodiments, the system comprises a yolk cooker having a plurality of first hemispherical yolk holders located on a yolk cooker first side and a plurality of second hemispherical yolk holders located on a yolk cooker second side. In some embodiments, the yolk cooker first side is pivotally located on the yolk cooker second side. In some embodiments, a yolk cooker handle is located on a yolk cooker second side exterior surface thereon. In some embodiments, the yolk cooker nests in the egg white pan.

In some embodiments, in a first operation water is poured into the reservoir pan. In some embodiments, one or more egg whites are poured into the egg white pan. In some embodiments, the egg white pan is placed in the reservoir pan. In some embodiments, the reservoir pan is placed on a heat source. In some embodiments, upon solidifying, the egg whites are removed and diced via the egg dicer.

In some embodiments, in a second operation, water is poured into the reservoir pan. In some embodiments, one or more egg yolks are placed into the second hemispherical yolk holders. In some embodiments, the yolk cooker is closed. In some embodiments, the yolk cooker is placed in the reservoir pan. In some embodiments, the reservoir pan is placed on a heat source. In some embodiments, upon solidifying, the yolks are removed from the yolk cooker.

DESCRIPTION OF PREFERRED EMBODIMENTS

Figure 1:
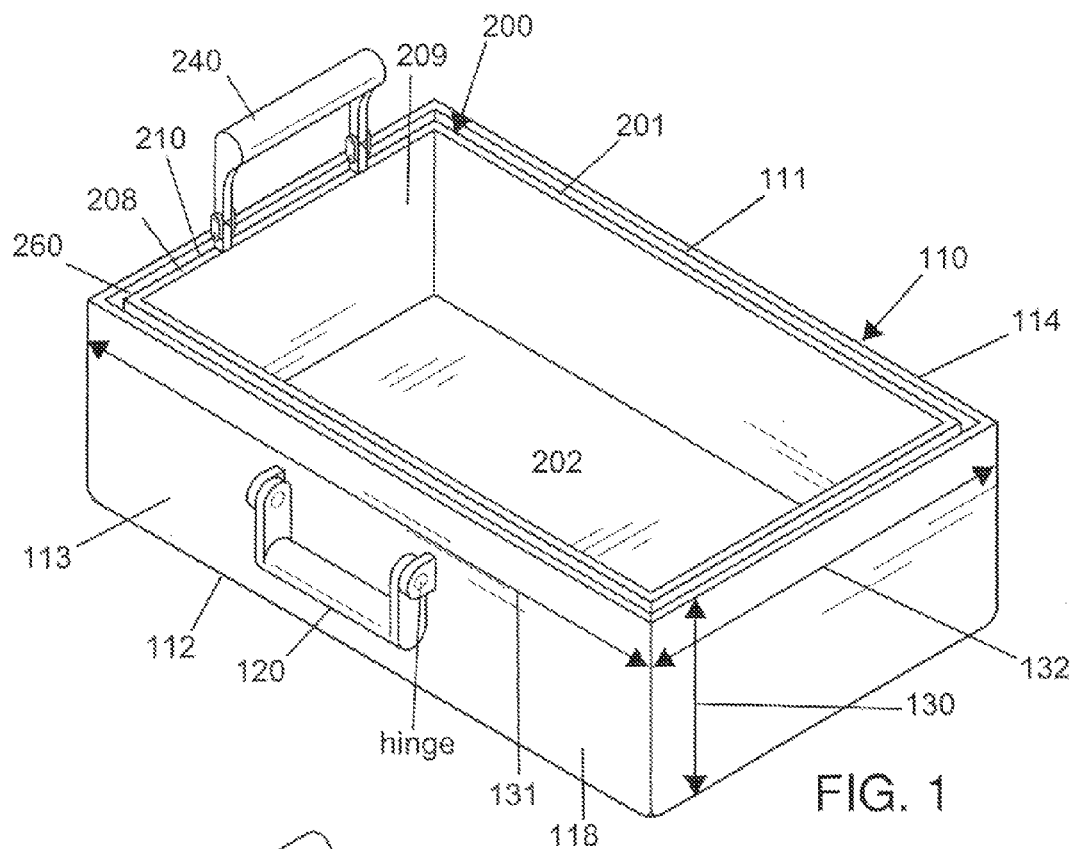
FIG. 1 shows a perspective view of a reservoir pan and an egg white pan of the present invention.
Figure 2:
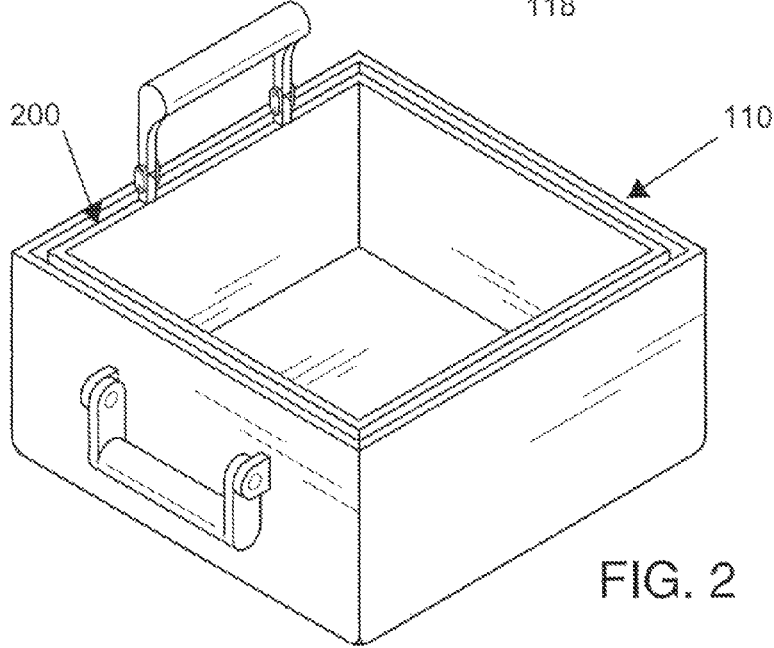
FIG. 2 shows a perspective view of an alternate embodiment of a reservoir pan and an egg white pan of the present invention.
Figure 3:
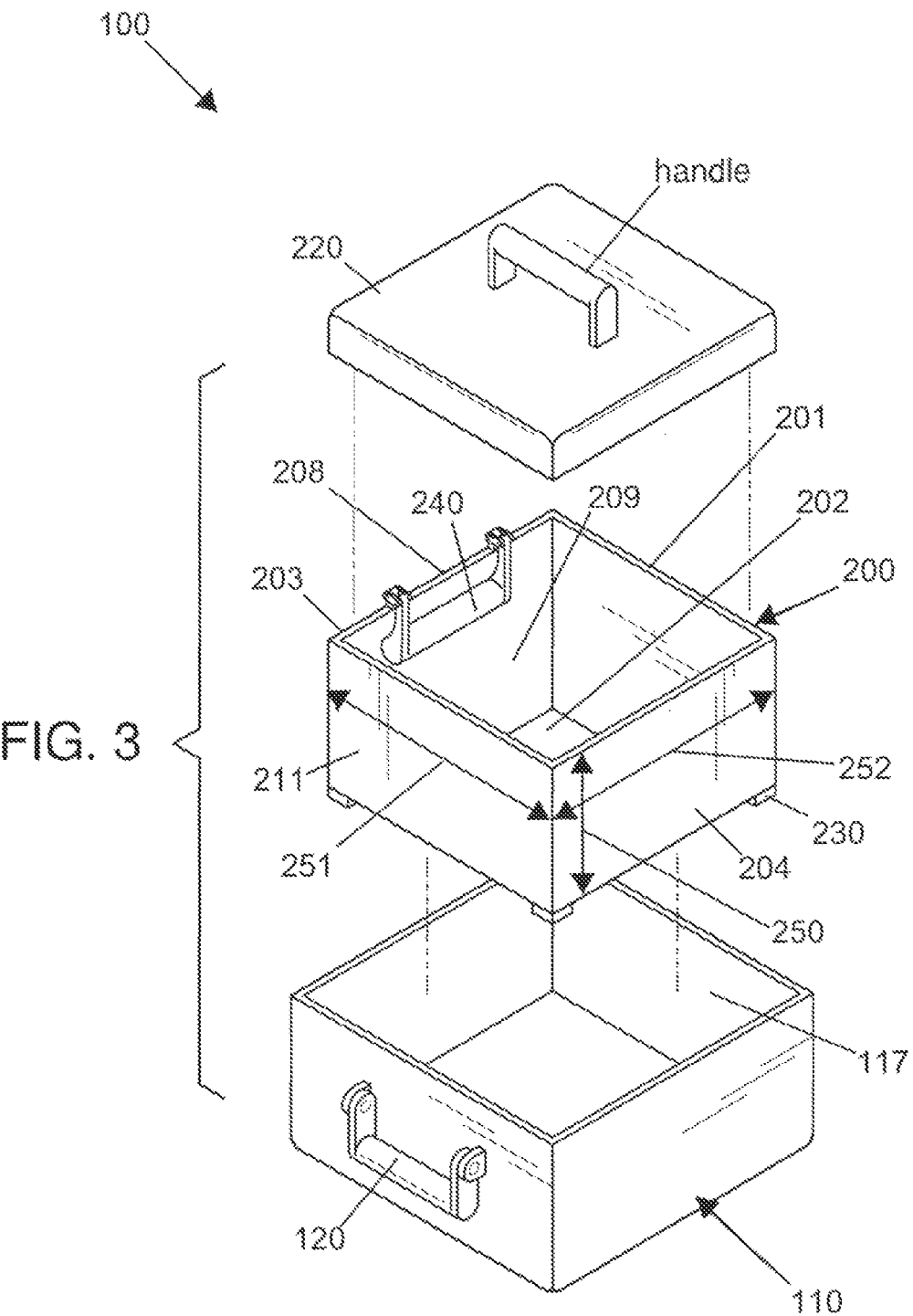
FIG. 3 shows an exploded view of a reservoir pan and an egg white pan of the present invention.
Figure 4:
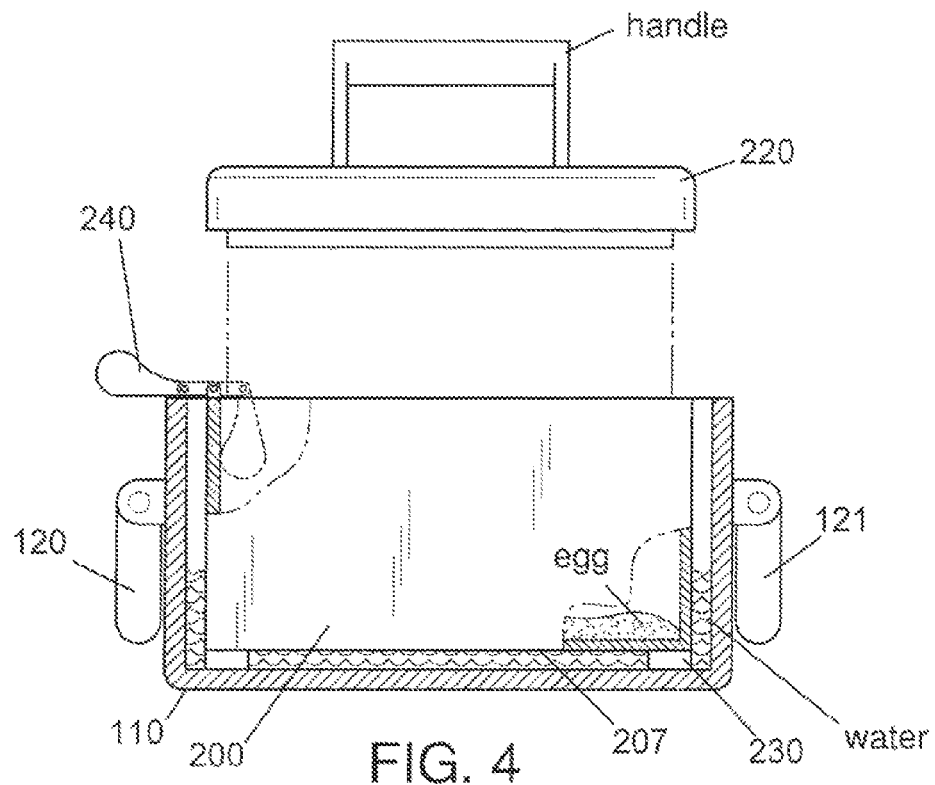
FIG. 4 shows a cross sectional view of a reservoir pan and an egg white pan of the present invention.
Figure 5:
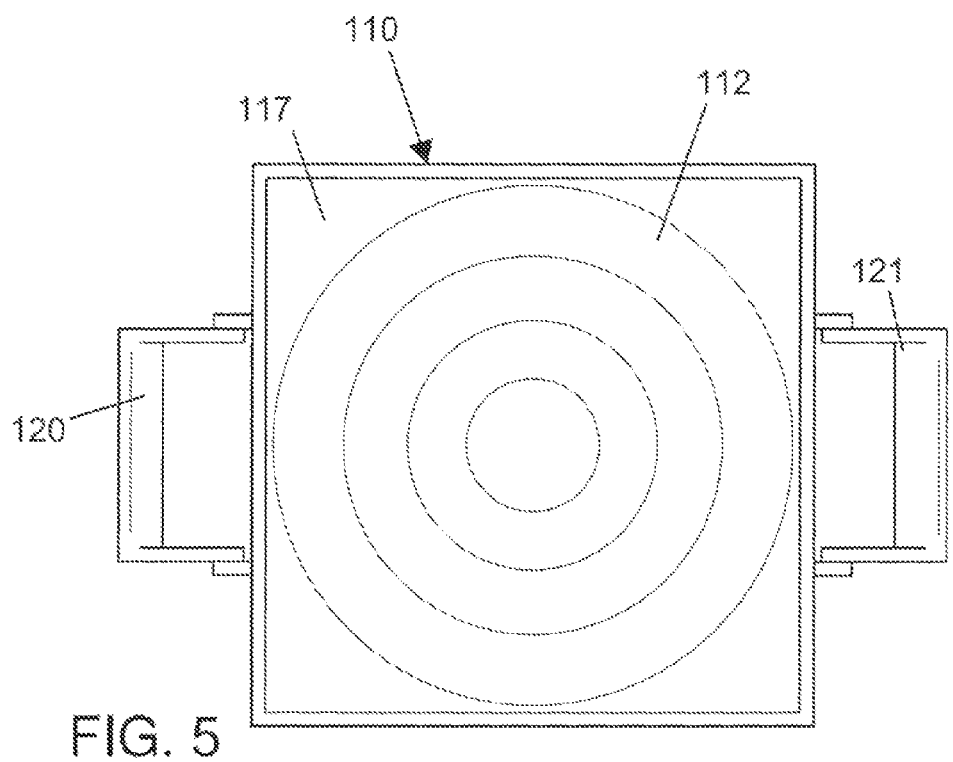
FIG. 5 shows a top view of a reservoir pan of the present invention.
Figure 6:
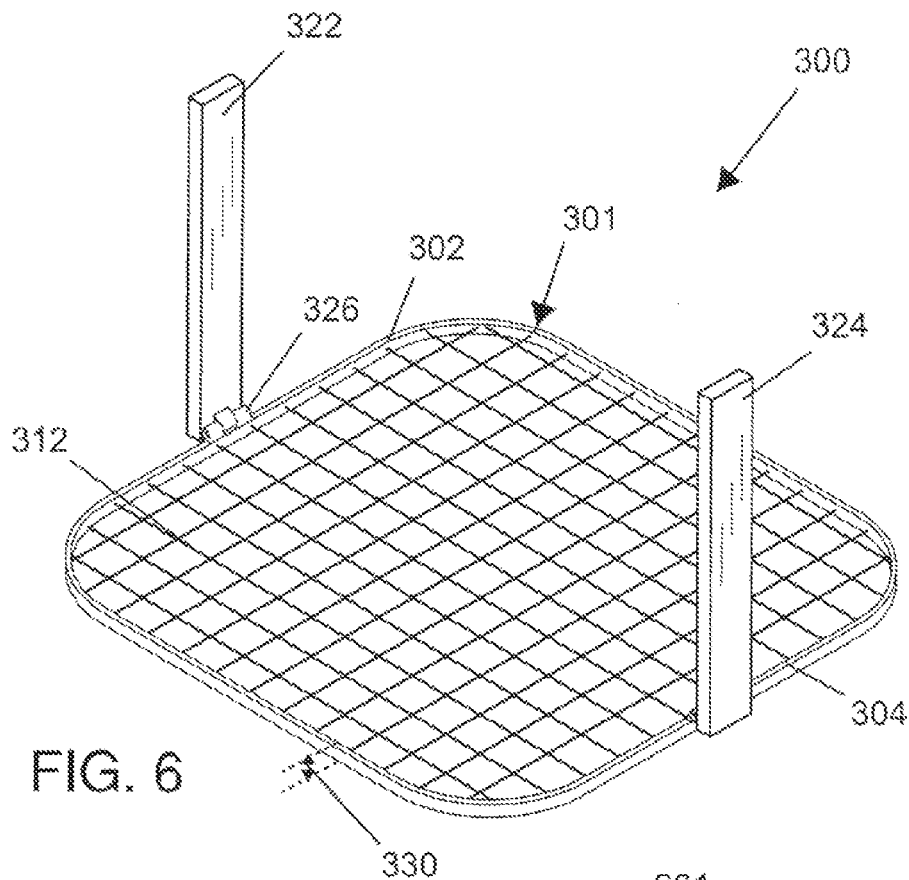
FIG. 6 shows a perspective view of an egg dicer of the present invention.
Figure 7:
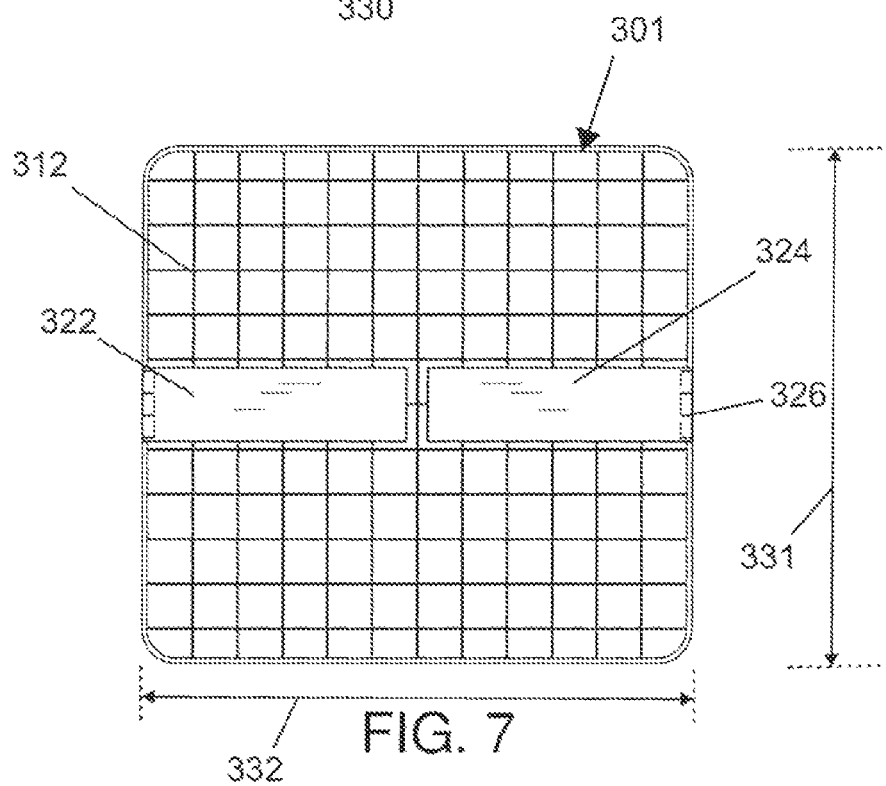
FIG. 7 shows a top view of an egg dicer of the present invention.
Figure 8:
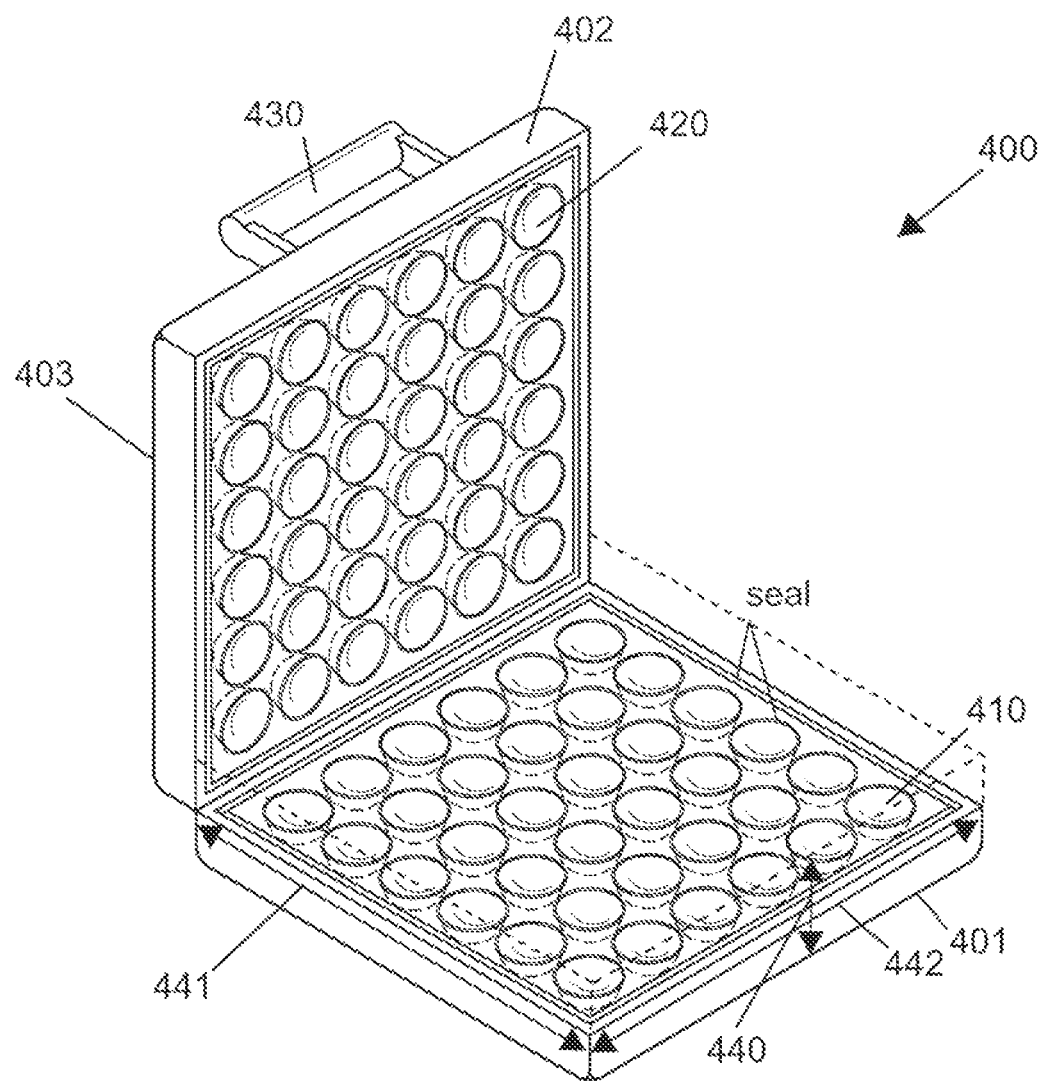
FIG. 8 shows a perspective view of a yolk cooker of the present invention.

Following is a list of elements corresponding to a particular element referred to herein:

100 Egg cooking system
110 Reservoir pan
111 Pan top
112 Pan bottom
113 Pan first side
114 Pan second side
117 Reservoir pan interior surface
118 Reservoir pan exterior surface
120 First pivoting handle
121 Second pivoting handle
130 Reservoir pan height
131 Reservoir pan length
132 Reservoir pan width
200 Egg white pan
201 Egg white pan top
202 Egg white pan bottom
203 Egg white pan first side
204 Egg white pan second side
207 Egg white pan bottom exterior surface
208 Egg white pan first side top edge
209 Egg white pan first side interior surface
210 Egg white pan first side exterior surface
211 Egg white pan exterior surface
220 Cover
230 Elevated foot
240 Doubly pivoting handle
250 Egg white pan height
251 Egg white pan length
252 Egg white pan width
260 Gap
300 Egg dicer
301 Dicer frame
302 Dicer frame first side
304 Dicer frame second side
312 Dicing wire
322 First dicer handle
324 Second dicer handle
326 Hinge
330 Egg dicer height 331 Egg dicer length
332 Egg dicer width
400 Yolk cooker
401 Yolk cooker first side
402 Yolk cooker second side
403 Yolk cooker first side exterior surface
410 First hemispherical yolk holder
420 Second hemispherical yolk holder
430 Yolk cooker handle
440 Yolk cooker height
441 Yolk cooker length
442 Yolk cooker width Referring now to FIG. 1-8, the present invention features an egg cooking system (100) for cooking egg whites and egg yolks separately. In some embodiments, the system (100) comprises a rectangular reservoir pan (110) having an open pan top (111), a planar pan bottom (112), a pan first side (113), and a pan second side (114) opposite the pan first side (113). In some embodiments, the pan first side (113) comprises a first pivoting handle (120) located on a reservoir pan exterior surface (118) thereon. In some embodiments, the pan second side (114) comprises a second pivoting handle (121) located on the reservoir pan exterior surface (118) thereon. In some embodiments, the reservoir pan (110) comprises a reservoir pan height (130), a reservoir pan length (131), and a reservoir pan width (132).

In some embodiments, the system (100) comprises an egg white pan (200) having an open egg white pan top (201), a planar egg white pan bottom (202), an egg white pan first side (203), and an egg white pan second side (204). In some embodiments, the egg white pan (200) comprises a cover (220) sealably and removably located on the egg white pan top (201). In some embodiments, the egg white pan (200) comprises a plurality of elevated feet (230) located on an egg white pan bottom exterior surface (207) thereon. In some embodiments, the egg white pan (200) comprises one doubly pivoting handle (240) located on an egg white pan first side top edge (208) thereon. In some embodiments, the doubly pivoting handle (240) is designed to fold flush against an egg white pan first side interior surface (209) or an egg white pan first side exterior surface (210) thereon. In some embodiments, the doubly pivoting handle (240) is designed to not fold flush against the egg white pan first side exterior surface (210); rather, the doubly pivoting handle (240) extends outwardly from and perpendicular to the egg white pan first side exterior surface (210).

In some embodiments, the egg white pan (200) comprises an egg white pan height (250), an egg white pan length (251), and an egg white pan width (252). In some embodiments, the egg white pan (200) nests in the reservoir pan (110). In some embodiments, the egg white pan height (250) is flush with the reservoir pan height (130), the egg white pan length (251) is smaller than the reservoir pan length (131), and the egg white pan width (252) is smaller than the reservoir pan width (132). In some embodiments, a gap (260) is located between an egg white pan exterior surface (211) and a reservoir pan interior surface (117) to accommodate boiling water to cook egg whites.

In some embodiments, the system (100) comprises a rectangular planar egg dicer (300) having a plurality of dicing wires (312) located on a perpendicular grid pattern in a dicer frame (301). In some embodiments, a first dicer handle (322) is pivotally located on a dicer frame first side (302) via a first hinge (326) and a second dicer handle (324) is pivotally located on a dicer frame second side (304) via a second hinge (326). In some embodiments, an egg dicer height (330) is smaller than the egg white pan height (250), an egg dicer length (331) is smaller than the egg white pan length (251), and an egg dicer width (332) is smaller than the egg white pan width (252). In some embodiments, the egg dicer (300) nests in the egg white pan (200).

In some embodiments, the system (100) comprises a rectangular planar egg dicer (300) having a plurality of dicer blades located on a perpendicular grid pattern. In some embodiments, a dicer handle is located on an egg dicer top surface thereon. In some embodiments, the egg dicer (300) nests in the egg white pan (200). In some embodiments, an egg dicer height (330) is smaller than the egg white pan height (250), am egg dicer length (331) is smaller than the egg white pan length (251), and an egg dicer width (332) is smaller than the egg white pan width (252).

In some embodiments, the system (100) comprises a yolk cooker (400) having a plurality of first hemispherical yolk holders (410) located on a yolk cooker first side (401) and a plurality of second hemispherical yolk holders (420) located on a yolk cooker second side (402). In some embodiments, the yolk cooker first side (401) is pivotally located on the yolk cooker second side (402). In some embodiments, the yolk cooker first side (401) matingly seals against the yolk cooker second side (402). In some embodiments, each second hemispherical yolk holder (420) is matingly located opposite each first hemispherical yolk holder (410). In some embodiments, each second hemispherical yolk holder (420) matingly seals against each first hemispherical yolk holder (410). In some embodiments, a yolk cooker handle (430) is located on a yolk cooker first side exterior surface (403) thereon. In some embodiments, the yolk cooker (400) nests in the egg white pan (200). In some embodiments, a yolk cooker height (440) is smaller than the egg white pan height (250), a yolk cooker length (441) is smaller than the egg white pan length (251), and a yolk cooker width (442) is smaller than the egg white pan width (252).

In some embodiments, in a first operation, water is placed in the reservoir pan (110). In some embodiments, egg whites are placed in the egg white pan (200). In some embodiments, the egg white pan (200) is placed in the reservoir pan (110). In some embodiments, the reservoir pan (110) is placed on a heat source. In some embodiments, upon solidifying, the egg whites are removed and diced via the egg dicer (300).

In some embodiments, in a second operation, water is placed in the reservoir pan (110). In some embodiments, one or more egg yolks are placed in the second hemispherical yolk holders (420). In some embodiments, the yolk cooker (400) is sealably closed. In some embodiments, the yolk cooker (400) is placed in the reservoir pan (110). In some embodiments, the reservoir pan (110) is placed on a heat source. In some embodiments, upon solidifying, the yolks are removed from the yolk cooker (400).

In some embodiments, the first hemispherical yolk holder (410) and the second hemispherical yolk holder (420) each comprise a polytetrafluoroethylene (Teflon™) coating.

In some embodiments, the egg white pan (200), the egg dicer (300), and the yolk cooker (400) are stackably located in the reservoir pan (110) for storage. In some embodiments, the egg dicer (300) and the yolk coker (400) are stackably located in the egg white pan (200) for storage.

As used herein, the term "about" refers to plus or minus 10% of the referenced number.

The disclosures of the following U.S. Patents are incorporated in their entirety by reference herein: U.S. Pat. No. D 255,756; U.S. Pat. No. 6,329,004; U.S. Pat. No. 6,303,915; U.S. Pat. No. 5,054,384; U.S. Pat. No. 4,413,167; and U.S. Pat. No. 3,791,285.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. An egg cooking system (100) for cooking egg whites and egg yolks separately, wherein the system (100) comprises:
    (a) a rectangular reservoir pan (110) having an open pan top (111), a planar pan bottom (112), a pan first side (113), and a pan second side (114) opposite the pan first side (113), wherein the pan first side (113) comprises a first pivoting handle (120) disposed on a reservoir pan exterior surface (118) thereon, wherein the pan second side (114) comprises a second pivoting handle (121) disposed on the reservoir pan exterior surface (118) thereon, wherein the reservoir pan (110) comprises a reservoir pan height (130), a reservoir pan length (131), and a reservoir pan width (132);
    (b) an egg white pan (200) having an open egg white pan top (201), a planar egg white pan bottom (202), an egg white pan first side (203), and an egg white pan second side (204), wherein the egg white pan (200) comprises a cover (220) sealably and removably disposed on the egg white pan top (201), wherein the egg white pan (200) comprises a plurality of elevated feet (230) disposed on an egg white pan bottom exterior surface (207) thereon, wherein the egg white pan (200) comprises one doubly pivoting handle (240) disposed on an egg white pan first side top edge (208) thereon, wherein the doubly pivoting handle (240) is designed to fold flush against an egg white pan first side interior surface (209) or an egg white pan first side exterior surface (210) thereon, wherein the egg white pan (200) comprises an egg white pan height (250), an egg white pan length (251), and an egg white pan width (252), wherein the egg white pan (200) nests in the reservoir pan (110), wherein the egg white pan height (250) is flush with the reservoir pan height (130), the egg white pan length (251) is smaller than the reservoir pan length (131), and the egg white pan width (252) is smaller than the reservoir pan width (132), wherein a gap (260) is disposed between an egg white pan exterior surface (211) and a reservoir pan interior surface (117);
    (c) a rectangular planar egg dicer (300) having a plurality of dicing wires (312) disposed on a perpendicular grid pattern in a dicer frame (301), wherein a first dicer handle (322) is pivotally disposed on a dicer frame first side (302) via a first hinge (326) and a second dicer handle (324) is pivotally disposed on a dicer frame second side (304) via a second hinge (326), wherein an egg dicer height (330) is smaller than the egg white pan height (250), an egg dicer length (331) is smaller than the egg white pan length (251), and an egg dicer width (332) is smaller than the egg white pan width (252); and
    (d) a yolk cooker (400) having a plurality of first hemispherical yolk holders (410) disposed on a yolk cooker first side (401) and a plurality of second hemispherical yolk holders (420) are disposed on a yolk cooker second side (402), wherein the yolk cooker first side (401) is pivotally disposed on the yolk cooker second side (402), wherein the yolk cooker first side (401) matingly seals against the yolk cooker second side (402), wherein each second hemispherical yolk holder (420) is matingly disposed opposite each first hemispherical yolk holder (410), wherein each second hemispherical yolk holder (420) matingly seals against each first hemispherical yolk holder (410), wherein a yolk cooker handle (430) is disposed on a yolk cooker first side exterior surface (403) thereon, wherein the yolk cooker (400) nests in the egg white pan (200), wherein a yolk cooker height (440) is smaller than the egg white pan height (250), a yolk cooker length (441) is smaller than the egg white pan length (251), and a yolk cooker width (442) is smaller than the egg white pan width (252);
    wherein in a first operation, water is disposed in the reservoir pan (110), wherein egg whites are disposed in the egg white pan (200), wherein the egg white pan (200) is disposed in the reservoir pan (110), wherein the reservoir pan (110) is disposed on a heat source, wherein upon solidifying, the egg whites are removed and diced via the egg dicer (300);
    wherein in a second operation, water is disposed in the reservoir pan (110), wherein one or more egg yolks are disposed in the second hemispherical yolk holders (420), wherein the yolk cooker (400) is sealably closed, wherein the yolk cooker (400) is disposed in the reservoir pan (110), wherein the reservoir pan (110) is disposed on the heat source, wherein upon solidifying, the yolks are removed from the yolk cooker (400).

2. The system of claim 1, wherein the first hemispherical yolk holder (410) and the second hemispherical yolk holder (420) each comprise a polytetrafluoroethylene coating.

3. The system of claim 1, wherein the egg white pan (200), the egg dicer (300), and the yolk cooker (400) are stackably disposed in the reservoir pan (110) for storage.

* * * * *